US006863267B2

(12) United States Patent
Bosmans et al.

(10) Patent No.: US 6,863,267 B2
(45) Date of Patent: Mar. 8, 2005

(54) GAS-LIQUID CONTACTING TRAY

(75) Inventors: Bernardinus Henricus Bosmans, Amsterdam (NL); Jose Luis Bravo, Amsterdam (NL); Gerrit Konijn, Amsterdam (NL); Karel Antonius Kusters, Amsterdam (NL)

(73) Assignee: Shell Oil Company, Houston, TX (US)

( * ) Notice: Subject to any disclaimer, the term of this patent is extended or adjusted under 35 U.S.C. 154(b) by 334 days.

(21) Appl. No.: 09/757,886

(22) Filed: Jan. 10, 2001

(65) Prior Publication Data

US 2001/0015503 A1 Aug. 23, 2001

(30) Foreign Application Priority Data

Feb. 16, 2000 (EP) .............................................. 00200516

(51) Int. Cl.$^7$ ................................................ B01F 3/04
(52) U.S. Cl. .................................. 261/114.1; 261/114.5
(58) Field of Search ........................... 261/114.1, 114.2, 261/114.3, 114.4, 114.5

(56) References Cited

U.S. PATENT DOCUMENTS

| | | | | |
|---|---|---|---|---|
| 3,410,540 A | * | 11/1968 | Bruckert ................... | 261/114.1 |
| 3,463,464 A | | 8/1969 | Nutter et al. ................ | 261/114 |
| RE27,908 E | | 1/1974 | Nutter et al. | |
| 4,496,430 A | * | 1/1985 | Jenkins ..................... | 261/114.5 |
| 4,504,426 A | * | 3/1985 | Chuang et al. ........... | 261/114.1 |
| 4,550,000 A | * | 10/1985 | Bentham .................. | 261/114.1 |
| 4,627,941 A | * | 12/1986 | Bentham .................. | 261/114.1 |
| 5,120,474 A | | 6/1992 | Binkley et al. ........... | 261/114.4 |
| 5,230,839 A | | 7/1993 | Sampath et al. | |
| 5,382,390 A | | 1/1995 | Resetarits et al. ........ | 261/114.3 |
| 5,407,605 A | | 4/1995 | Resetarits et al. ............ | 261/98 |
| 5,454,989 A | | 10/1995 | Nutter ...................... | 261/114.1 |
| 5,547,617 A | | 8/1996 | Lee et al. ................. | 261/114.5 |
| 5,702,647 A | | 12/1997 | Lee et al. ................. | 261/114.5 |
| 5,911,922 A | | 6/1999 | Hauser et al. ........... | 261/114.4 |
| 5,951,827 A | * | 9/1999 | Breedon ................... | 261/114.1 |
| 6,299,146 B1 | * | 10/2001 | Yu et al. ................... | 261/114.1 |
| 2001/0047921 A1 | * | 12/2001 | Bravo ....................... | 196/14.52 |

FOREIGN PATENT DOCUMENTS

| | | |
|---|---|---|
| DE | 1519705 | 3/1970 |
| EP | 0092262 A1 | 10/1983 |
| EP | 0244896 A2 | 11/1987 |
| EP | 0882481 A1 | 12/1998 |
| GB | 1126586 | 9/1968 |
| GB | 1416731 | 12/1975 |
| GB | 1422131 | 1/1976 |
| WO | 9737741 | 10/1997 |
| WO | 9828056 | 7/1998 |
| WO | WO 99/12621 | 3/1999 |

OTHER PUBLICATIONS

Henry Z. Kister, "Distillation Operation", pp. 172–175, McGraw–Hill, Inc., 1990.
Henry Z. Kister, "Distillation Design", pp. 260–267, McGraw–Hill, Inc., 1992.
"High Capacity Distillation," *Hydrocarbon Processing*, US, Gulf Publishing Co., Houston, vol. 77, No. 8, Aug. 1, 1998, pp. 53,55,57–60 and Figure 15.
International Search Report of Jul. 6, 2001.

* cited by examiner

*Primary Examiner*—Scott Bushey
(74) *Attorney, Agent, or Firm*—Charles W. Stewart

(57) ABSTRACT

Gas-liquid contacting tray having a bubble area and one or more rectangular downcomers which are longer in length than in width, which downcomers have two sloped downcomer walls along their length, a downcomer opening at tray level and one or more downward directed liquid discharge openings at the lower end, which downcomers are so positioned on the tray that bubble area is present at both of the longer sides, wherein the cross-sectional area at the lower end of the downcomer is less than 40% of the cross-sectional area of the upper end of the downcomer at tray level.

7 Claims, 4 Drawing Sheets

US 6,863,267 B2

GAS-LIQUID CONTACTING TRAY

FIELD OF THE INVENTION

The invention relates to a gas-liquid contacting tray comprising a bubble area and one or more rectangular downcomers which are longer in length than in width, which downcomer comprises two sloped downcomer walls along its length, a downcomer opening at tray level and one or more downward directed liquid discharge openings at its lower end, which downcomers are so positioned on the tray that bubble area is present at both of its longer sides.

BACKGROUND OF THE INVENTION

Such a tray is known from U.S. Pat. No. 4,550,000. This publication describes a vertical gas-liquid contacting column provided with a plurality of trays. These trays comprise of a rectangular downcomer having inclined side walls and liquid discharge openings in the closed lower end of the downcomer. According to this publication the aggregate area of the liquid discharge openings in the lower end of the downcomer should be sufficient for discharging all the liquid which flows down the column at the intended liquid loading and should be restricted in relation with the horizontal cross-sectional area of this lower end of the downcomer so as to maintain in the downcomer a column of liquid which exerts at the liquid discharge openings a hydrostatic head which is sufficient to prevent gas from entering the downcomer from below.

In the above publication no further reference is given to the actual slope or cross-sectional area in the lower end of the downcomer. According to general textbooks like "Distillation Operation" by Henry Z. Kister, McGraw-Hill Inc, 1990, pages 173–175, the ratio of the cross-sectional area at tray level to the cross-sectional area at the bottom of a sloped downcomer is between 1.5 and 2.0 and typically 1.7.

U.S. Pat. No. 5,407,605 describes a tray provided with rectangular downcomers having no cross-sectional area at the lower end. Instead the downcomer walls meet at their lower end and side-wards directed liquid discharge openings are present in the lower end of the downcomer walls. According to this publication the horizontal velocity of the liquid being discharged from these openings is beneficial because it helps spreading the liquid over any packing which may be located below the tray.

When trying to increase the liquid and/or gas flows of gas-liquid contacting columns, which are provided with the above described trays of U.S. Pat. No. 4,550,000, a maximum load will be observed. Higher loads will result in that the column fails to function as a liquid-gas contactor or separator due to a phenomena known as flooding. Flooding is described as excessive accumulation of liquid inside the column. The well known flooding mechanisms are downcomer back-up, jet flooding and downcomer choking. These mechanisms are described in the above referred to general textbook "Distillation Design", Henry Z. Kister, McGraw-Hill Inc, 1992, page 267–291. According to this publication downcomer back-up is due to a build-up of liquid inside the downcomer causing the liquid to back-up on the tray leading to liquid accumulation on that tray. The liquid height in the downcomer is determined by the tray pressure drop, liquid height on the tray and frictional losses in the downcomer and downcomer slot area. Jet flooding or entrainment flooding is caused by a too high gas velocity leading to the entrainment of liquid, either by droplets or froth, to the tray above. The liquid will accumulate and leads to flooding. Downcomer choking is caused by a too high aerated liquid velocity in the downcomer. At a certain velocity the friction losses in the downcomer and downcomer entrance become excessive, and the frothy gas-liquid mixture cannot be transported to the tray below, causing liquid accumulation on the tray. With the term froth is to be understood any gas-liquid mixture present on the tray not depending on any flow regime.

SUMMARY OF THE INVENTION

The present invention relates to an improved tray, comprising rectangular downcomers and downward directed liquid discharge openings, with respect to its tendency of flooding and more in particular with respect to downcomer choking and downcomer backup limitations.

This object is achieved with the following gas-liquid contacting tray. Gas-liquid contacting tray comprising a bubble area and one or more rectangular downcomers which are longer in length than in width, which downcomer comprises two sloped downcomer walls along its length, a downcomer opening at tray level and one or more downward directed liquid discharge openings at its lower end, which downcomers are so positioned on the tray that bubble area is present at both of its longer sides, wherein the cross-sectional area at the lower end of the downcomer is less than 40% of the cross-sectional area of the upper end of the downcomer at tray level.

It has been found that, when a tray provided with these very sloped downcomers is used, less froth backup in the downcomers is observed. Applicants believe that this advantage is achieved because of the strong sloping of the downcomer walls. Without wanting to limit the invention in any manner it is believed that the liquid flows downwards in the downcomer with an accelerating speed thereby dragging along vapour bubbles captured inside the froth. Hence there is less chance for the vapour bubbles to escape the froth entering the downcomer. This results in that more gas is discharged via the liquid discharge openings in the downcomer bottom to the tray below than was the case in less sloped downcomers. The negative effect of this back-flow of gas is however largely compensated by the gain in capacity. Because of less interaction between rising bubbles and downwards flowing liquid, there is less froth built-up in the downcomers. This extends the capacity of the tray when limited due to froth backup in the downcomers. Furthermore, choking of the downcomers will occur at larger liquid loads because of the reduced interaction between rising bubbles and downwards flowing liquid. Thus when such a tray is used in a gas-liquid contacting column a higher capacity with respect to downcomer choking and froth backup limitation will be observed. Another advantage is that, because the area of the liquid discharge openings is also decreased, a smaller liquid receiving area will be present on the tray just below, which in turn makes it possible to increase the effective bubble area on said trays. Because of the resulting longer flow path length a further increase in the contacting efficiency will be achieved. Liquid receiving area is defined as the area just below the liquid discharge openings of the consecutive tray above in a column provided with a plurality of axially spaced trays according to the invention. The flow path is the horizontal part of the liquid flow path on a tray, wherein the liquid is intimately contacted with the upwardly moving gas.

Figure 1:
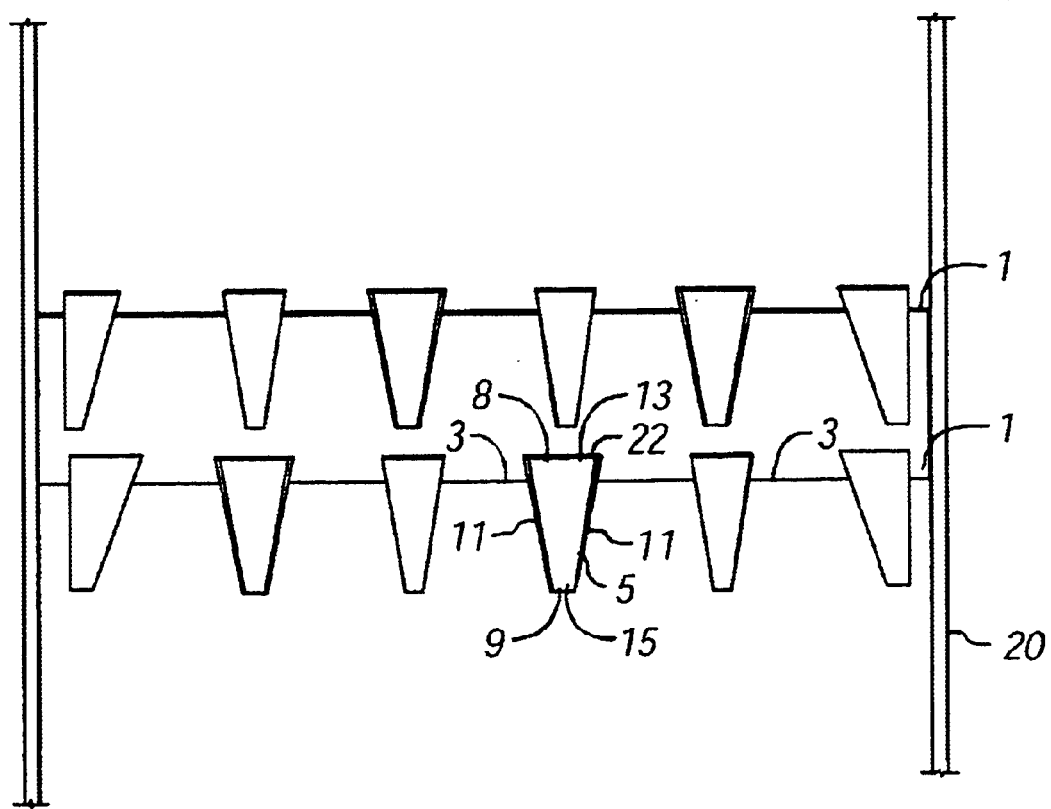
FIG. 1 shows a side view of an embodiment of two trays of the invention in a column.
Figure 2:
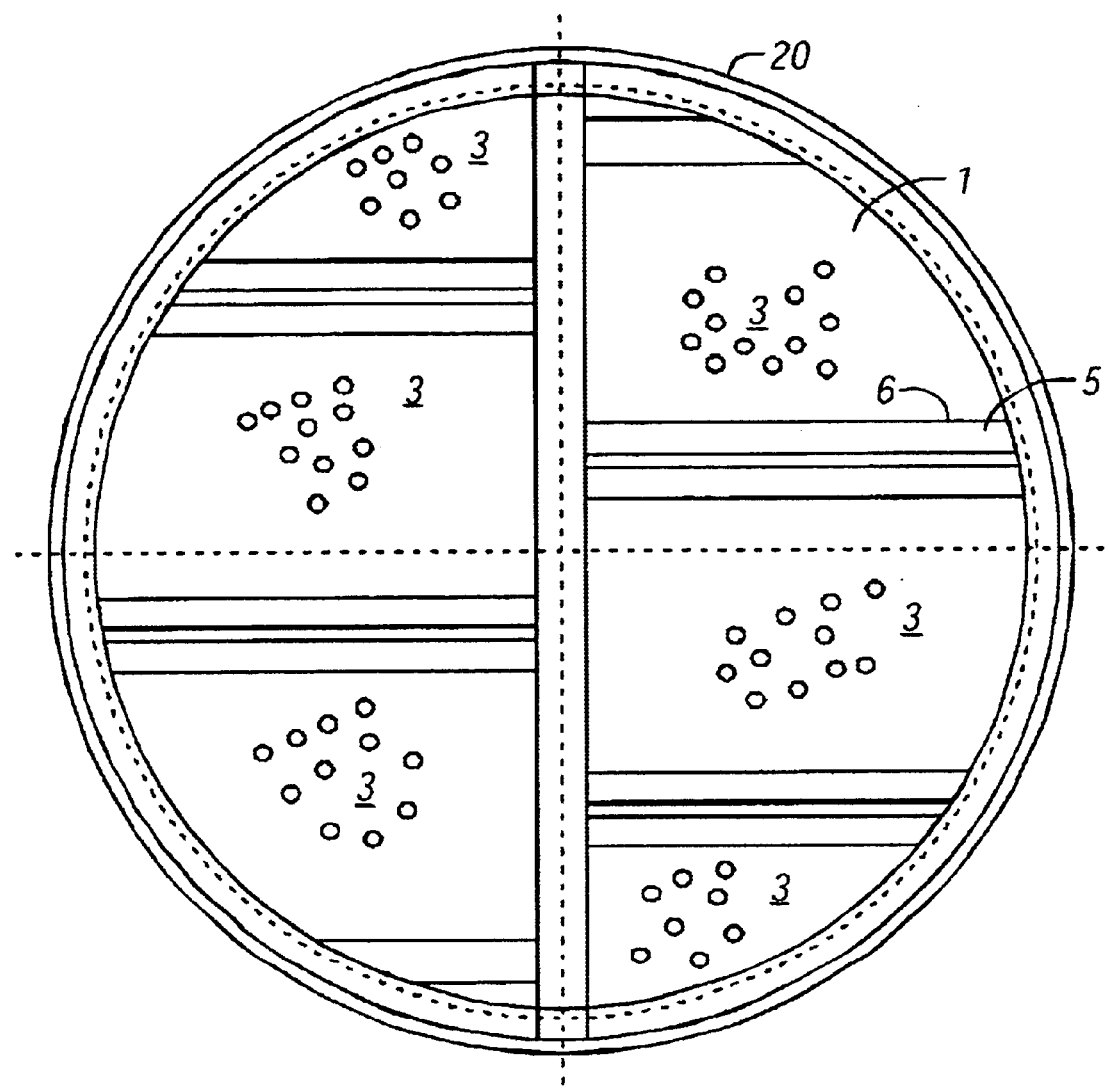
FIG. 2 shows a top view of the lower tray of FIG. 1.
Figure 3:
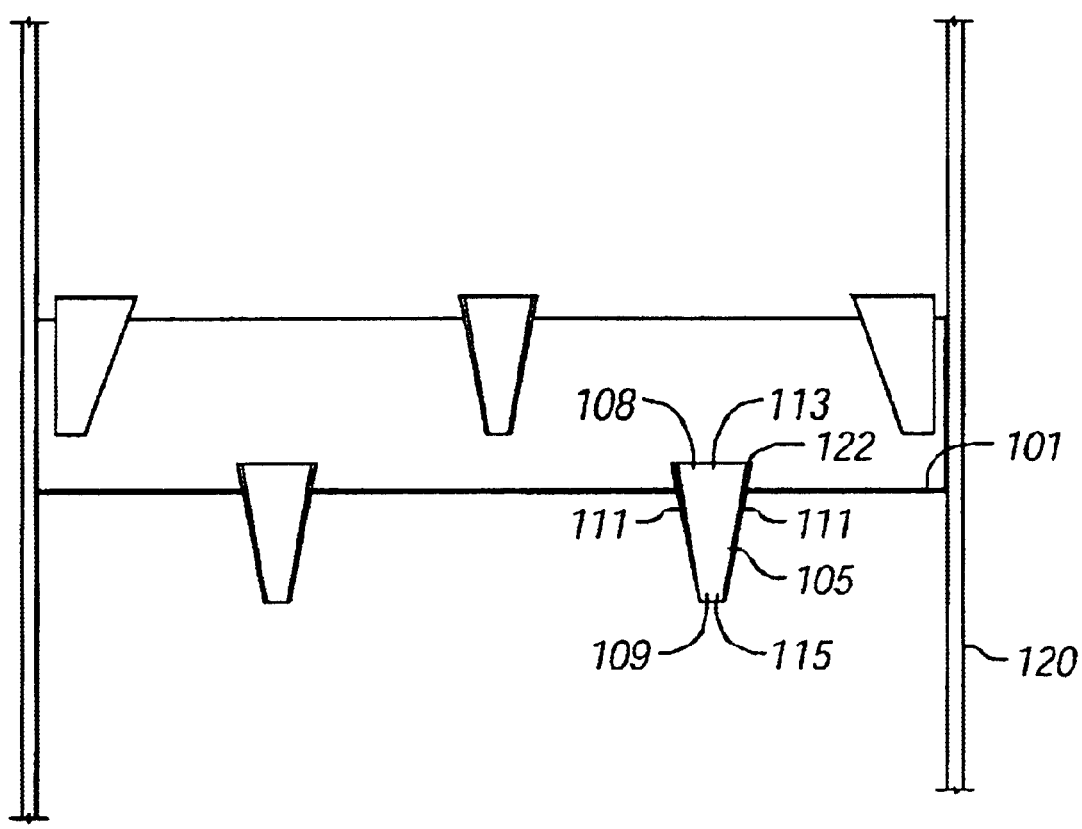
FIG. 3 shows a side view of an embodiment of two trays of the invention in a column.
Figure 4:
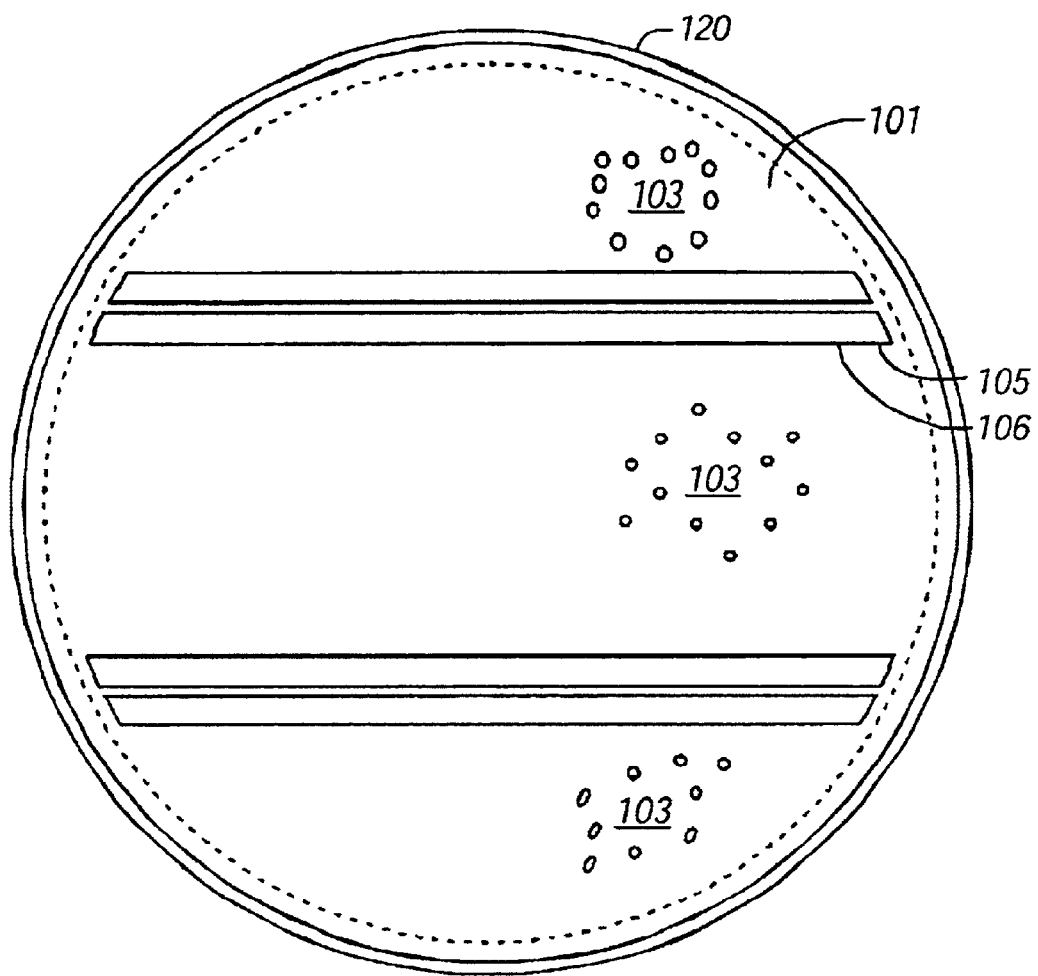
FIG. 4 shows a top view of the lower tray of FIG. 3.

Referring now to the Figures, FIG. 1 shows a side view of an embodiment of two trays of the invention in a column 20. Gas-liquid trays 1 are shown as arranged in a column 20. Rectangular downcomers 5 are arranged along a diametrical line across the tray such that the ends of the downeomers in each tray section meet this line in an alternating or staggered fashion. The double lines indicate downcomers in the foreground, while those with single lines represent those in the background. FIG. 1 shows the upper end 8 of the downcomers, the lower end 9, the downcomer opening at tray level 13, the downcomer walls 11, and the liquid discharge opening 15. Additionally a weir 22 is shown at the boundary of the bubble area 3 and the downcomer opening 13. FIG. 2 shows a top view of the lower tray of FIG. 1. From this figure, it can be seen that bubble area 3 is present on both of the longer sides of the downcomer 5. FIGS. 3 and 4 show an alternate arrangement in a column 120 in which each rectangular downcomer 105 extends across the entire tray 101. The figure shows the downcomer features: upper end 108, lower end 109, wall 111, opening at tray level 113, liquid discharge opening 115, and weir 122 at the boundary 106 of the downcomer 105 and the bubble area 103.

The cross-sectional area at the lower end of the downcomer is defined as the area between the two lower ends of the elongated walls of the rectangular downcomer. The cross-sectional area of the downcomer at tray level is defined as the area between the two elongated walls of the rectangular downcomer at tray level. Preferably the cross-sectional area at the lower end of the downcomer is more than 5% and more preferably more than 10% of the cross-sectional area of the upper end of the downcomer at tray level. Preferably the cross-sectional area at the lower end of the downcomer is less than 30% of the cross-sectional area of the upper end of the downcomer at tray level.

A rectangular downcomer is defined as a downcomer with a downcomer opening at tray level having two elongated sides and two smaller end sides. A rectangular downcomer for this invention also includes a downcomer having a downcomer opening wherein the smaller end side nearest to the circumferential of the tray runs along this circumferential, resulting that these smaller end sides are not parallel arranged relative to each other. This design of the downcomer opening ensures a maximum opening area on the tray. Preferably a downcomer opening is used having parallel smaller end sides.

Examples of tray layouts including rectangular downcomers are described in U.S. Pat. No. 5,547,617, U.S. Pat. No. 5,702,647, U.S. Pat. No. 5,382,390, GB-A-1416731 and U.S. Pat. No. 3,410,540. These publications describe rectangular downcomers with sloped and/or vertical walls. The present invention can advantageously be combined with the specific embodiments as described in these publications without ordinary skills. The tray layout may be such that the rectangular downcomers are arranged parallel relative to each other in one row. Between consecutive downcomers in this row bubble area and liquid receiving area is present. Preferably a row comprising a plurality of sequences of downcomer, bubble area and liquid receiving area is used. Two consecutive trays are then so arranged that a downcomer will be positioned above a liquid receiving area of a consecutive lower tray. All rectangular downcomers in the column will then be parallel arranged. Alternatively the downcomers of consecutive trays can be arranged perpendicular with respect to each other. In such an embodiment preferably no liquid discharge openings are present above a downcomer opening of a lower consecutive tray. At both ends of such a row of parallel downcomers a segmental downcomer may be present. This segmental downcomer will have a downcomer opening which at one end runs parallel to the rectangular downcomers and at the other end follows the circumferential of the tray.

Preferably rectangular downcomers are arranged on the tray in a so-called staggered arrangement. In this arrangement the tray is divided along a horizontal diametrical line in two tray sections, each tray section provided with one or more parallel arranged rectangular downcomers positioned perpendicular to the diametrical line. These downcomers extends from the wall, or near to the wall, to the diametrical line of the tray, such that the ends of the downcomers in one tray section meet the diametrical line alternating with the ends of the downcomers in the opposite tray section. Preferably 1–10 rectangular shaped parallel downcomers are present in one tray section. Additionally one or more segmental downcomers may be present on a tray section where the diametrical line meets the column wall. Such a segmental downcomer will have an opening which runs parallel to the longitudinal side of the rectangular downcomers, along the circumferential of the tray and along part of the diametrical line.

When such trays having a staggered tray layout are placed in a column, two consecutive trays will be mirror images of each other with the diametrical line as mirror. This ensures that a downcomer is positioned above the liquid receiving area of the tray below. A staggered tray is preferably constructed such that the downcomer is supported at one smaller end by central supporting beam placed along the diametrical line and at the other end by a circumferential beam running along the inner wall of the column as for example described in GB-A-1422131.

Preferably a weir is present on the tray. A weir is a device positioned on or about on the boundary of the bubble area and the downcomer opening which ensures that a certain pre-selected amount of liquid is present on the upper surface of the bubble area.

The downcomer is preferably a truncated downcomer. U.S. Pat. No. 4,550,000 describes and example of a rectangular truncated downcomer. A truncated downcomer is characterised in that, when in use, its liquid discharge openings are not submerged in the clear liquid level which is typically present just above the upper surface of the tray or bubble area. In other words, no liquid seal is present between the liquid discharge opening of the downcomer and the space above a consecutive lower tray. Truncated downcomers preferably extends to between 30 and 90% and preferably between 50 and 75% of the tray spacing below a tray. Furthermore the liquid discharge openings of truncated downcomers will be positioned at a higher vertical position than the top end of an optional weir. Tray spacing (TS) being defined as the distance between two consecutive gas-liquid contacting trays in a column. Typical tray spacing is between 0.2 and 1 m.

Embodiments of the invention with truncated downcomers are preferably provided with an inlet weir along the boundary of the liquid receiving area and the bubble area. The inlet weir can be disposed vertically or inclined. The inlet weir may run along said entire boundary or may optionally be interrupted. The inlet weir may be solid. Preferably openings are present in the inlet weir. The height of the inlet weir is preferably less than 50% of the distance between the liquid discharge openings and the liquid receiving area below said openings. More preferably the vertical height is between 0.01 and 0.05 m.

The lower end of the downcomer may comprise a cover, which cover is provided with liquid discharge openings. Preferably the lower end of the downcomer is open, meaning that the opening through which the liquids leave the downcomer in a downwards direction is formed by the space between the lower longitudinal ends of the downcomer walls. Bridges at intermediate positions along such an elongated liquid discharge opening connecting the lower ends of both downcomer walls are preferably present for obvious construction reasons. In case the downcomer is a truncated downcomer, the total area of the liquid discharge openings should be such that a sufficient column of liquid is maintained in the downcomer to exert at said openings a hydrostatic head which is sufficient to prevent gas from entering the downcomer from below.

The downcomer walls may be any shape, for example having a vertical top part combined with a sloped lower part. Preferably the two elongated walls of the rectangular downcomer are sloped towards each other from tray level to the lower end of the downcomer. Such a fully sloped wall will result in a greater capacity gain. If a weir is present it has been found advantageous to incline this weir towards the bubble area. In an even more preferred embodiment downcomer wall and weir are arranged in one plane and advantageously made from one metal plate.

For the present invention it is not critical which kind of openings are used in the bubble area of the tray. Examples of possible openings are sieve tray openings, valve tray openings, bubble cap openings and fixed valve openings. Examples of these openings can be found in general text books such as the afore-mentioned general textbook of Kister on pages 260–267 and in U.S.-RE-27,908, U.S. Pat. No. 5,120,474, WO-A-9828056, WO-A-9737741, U.S. Pat. No. 5,911,922, U.S. Pat. No. 3,463,464 and U.S. Pat. No. 5,454,989.

The downcomer is preferably provided with a rectangular shaped anti-jump baffle, vertically positioned along the longitudinal centre in the opening of the downcomer. This anti-jump baffle plate is suitably supported from both sides by supports which are fixed to the inside of the downcomer walls.

It has further found advantageous to provide the downcomer with so-called anti-sloshing baffles. Applicants have found that when vertical plates spaced apart from each other and arranged parallel to the width of the downcomer are present in the lower half of the downcomer less sloshing will occur. Sloshing occurs especially in elongated downcomers, for example longer than 0.5 m, where liquid moves from one end to the other and back. These plates may extend a certain distance from the inner side of the downcomer wall or may optionally extend all the way to the opposite downcomer wall. In the last embodiment the anti-sloshing baffles will also add to the mechanical strength of the downcomer itself. In an even more preferred embodiment the anti-sloshing baffles are at the same time the supports for the above described anti-jump baffle.

The tray according to the invention is preferably used in a gas-liquid contacting or separation column, which column is provided with these trays, axially spaced away from each other. Contacting can be absorption processes wherein a downwardly moving liquid is contacted with a upwardly moving gas. Separation is typically a distillation process to separate one or more components from a feed. Typically the feed of a distillation process is supplied to an intermediate position in the column, wherein trays are present above and below said inlet position. Such a column is further provided with reboiler, condensation and reflux means.

The column is preferably used to contact or separate gas and liquids, wherein the gas-liquid system may be of the non-foaming or foaming type.

We claim:

1. A column comprising a plurality of axially spaced trays with a distance of a tray space between the trays, in which each tray comprises:
   a bubble area; and
   a truncated rectangular downcomer sharing at least two boundaries with the bubble area, wherein the rectangular downcomer has a length and a width, wherein the length is longer than the width, and an upper end and a lower end, and wherein the truncated rectangular downcomer comprises:
   two sloped downcomer walls along the length;
   a downcomer opening at tray level; and,
   a downward directed liquid discharge openings at the lower end; wherein the truncated rectangular downcomer is so positioned on the tray that bubble area is present along the length, wherein the cross-sectional area at the lower end of the truncated rectangular downcomer is less than 40% of the cross-sectional area of the upper end of the downcomer at tray level, and wherein the truncated rectangular downcomer extends to between about 50 and 90% of the tray spacing below a tray; and wherein the truncated rectangular downcomer is arranged in a staggered arrangement in which each tray is divided into two tray sections by a diametrical line with each tray section provided with a row of the truncated rectangular downcomer arranged perpendicular to the diametrical line such that the ends of the truncated rectangular downcomer of each tray section meet the diametrical line in an alternating fashion; and wherein each tray section includes a segmented downcomer.

2. The column of claim 1, in which the cross-sectional area at the lower end of the truncated rectangular downcomer is between about 5 and 40% of the cross-sectional area of the upper end of the truncated rectangular downcomer at tray level.

3. The column of claim 2, in which the cross-sectional area at the lower of the truncated rectangular downcomer is between about 10 and 30% of the cross-sectional area of the upper end of the truncated rectangular downcomer at tray level.

4. The column of claim 3, in which the lower liquid discharge opening is formed by the elongated opening between the longitudinal lower ends of the truncated rectangular downcomer walls.

5. The column of claim 4, in which each of the truncated rectangular downcomers of the row of truncated rectangular downcomers is positioned parallel relative towards each other, wherein each truncated rectangular downcomer extends from one point on the circumferential to the opposite point on the circumferential of the tray.

6. The column of claim 5, in which an inlet weir is present along a boundary of an area just below the liquid discharge openings of a tray and the corresponding bubble area.

7. The column of claim 6 in which the column comprises a distillation column or an absorption column.

* * * * *